(12) United States Patent
Du et al.

(10) Patent No.: US 12,248,667 B2
(45) Date of Patent: Mar. 11, 2025

(54) SMART INTERACTIVE BOARD, DISPLAY METHOD THEREFOR, AND READABLE STORAGE MEDIUM

(71) Applicants: BOE Intelligent IoT Technology Co., LTD., Beijing (CN); BOE Technology Group Co., Ltd., Beijing (CN)

(72) Inventors: Zilong Du, Beijing (CN); Yan Shen, Beijing (CN); Yishuang Li, Beijing (CN); Tailiang Li, Beijing (CN)

(73) Assignees: BOE Intelligent IoT Technology Co., LTD., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/250,451

(22) PCT Filed: Oct. 11, 2021

(86) PCT No.: PCT/CN2021/123101
§ 371 (c)(1),
(2) Date: Apr. 25, 2023

(87) PCT Pub. No.: WO2022/111078
PCT Pub. Date: Jun. 2, 2022

(65) Prior Publication Data
US 2023/0367462 A1    Nov. 16, 2023

(30) Foreign Application Priority Data
Nov. 30, 2020  (CN) .......................... 202011381996.7

(51) Int. Cl.
*G06F 3/04842*  (2022.01)
*G06F 3/04817*  (2022.01)
*H04N 23/63*    (2023.01)

(52) U.S. Cl.
CPC ...... *G06F 3/04842* (2013.01); *G06F 3/04817* (2013.01); *H04N 23/631* (2023.01); *H04N 23/633* (2023.01)

(58) Field of Classification Search
CPC .............. G06F 3/0481; G06F 3/04842; G06F 3/04817; H04N 23/631; H04N 23/633
See application file for complete search history.

(56) References Cited

U.S. PATENT DOCUMENTS 10,165,108 B1 *  12/2018  Douglas ............. G06Q 30/0262
10,600,139 B2 *   3/2020  Angorn ............. G06Q 30/0641
(Continued)

FOREIGN PATENT DOCUMENTS

| CN | 102855052 A | 1/2013 |
| CN | 103079004 A | 5/2013 |

(Continued)

OTHER PUBLICATIONS

International Search Report and Written Opinion, mailed Jan. 14, 2022, from PCT/CN2021/123101, 16 pages.
(Continued)

*Primary Examiner* — Anil K Bhargava
(74) *Attorney, Agent, or Firm* — Workman Nydegger

(57) ABSTRACT

The present invention provides a smart interactive board, a display method therefor, and a readable storage medium. The display method includes: upon receiving a corresponding operation instruction of a user, controlling a smart interactive board to be switched to a timeline reminder interface; the timeline reminder interface displaying a timeline and a newly-built signature wall icon, displaying, on the timeline in a temporal order, a thumbnail corresponding to stored reminder information; upon receiving an instruction that the user selects newly-built signature wall icon, controlling the smart interactive board to be switched to a
(Continued)

newly-built signature wall interface, the signature wall interface including a picture adding interface; upon receiving an instruction that the user saves the signature wall interface, controlling the smart interactive board to be switched to the timeline reminder interface, displaying, on the timeline reminder interface, the thumbnails corresponding to the reminder information included in the signature wall interface.

16 Claims, 8 Drawing Sheets

(56) References Cited

U.S. PATENT DOCUMENTS

| | | | | |
|---|---|---|---|---|
| 10,686,984 | B1* | 6/2020 | Schmidt | H04N 23/66 |
| 11,430,068 | B1* | 8/2022 | Guerrero | G06F 3/04817 |
| 2006/0090141 | A1* | 4/2006 | Loui | G06F 16/447 |
| | | | | 715/764 |
| 2006/0224993 | A1* | 10/2006 | Wong | G06F 16/54 |
| | | | | 715/838 |
| 2012/0098999 | A1* | 4/2012 | Chen | H04N 5/772 |
| | | | | 348/222.1 |
| 2013/0275151 | A1* | 10/2013 | Moore | G06Q 10/10 |
| | | | | 705/3 |
| 2014/0059463 | A1* | 2/2014 | Wu | G06F 3/0481 |
| | | | | 715/771 |
| 2014/0275819 | A1* | 9/2014 | Kassem | A61B 5/021 |
| | | | | 600/301 |
| 2015/0106722 | A1* | 4/2015 | Ubillos | G06F 3/0488 |
| | | | | 715/731 |
| 2015/0370474 | A1* | 12/2015 | Belaunde | G06F 3/04845 |
| | | | | 715/723 |
| 2017/0032219 | A1* | 2/2017 | Zhang | G06F 16/54 |
| 2019/0045130 | A1* | 2/2019 | Mukherjee | H04N 23/62 |
| 2020/0258184 | A1* | 8/2020 | Angorn | H04L 67/02 |
| 2021/0311599 | A1* | 10/2021 | Wu | G06F 3/0483 |
| 2023/0230175 | A1* | 7/2023 | Davis | G06F 3/0482 |
| | | | | 705/4 |

FOREIGN PATENT DOCUMENTS

| | | |
|---|---|---|
| CN | 104104767 A | 10/2014 |
| CN | 104182313 A | 12/2014 |
| CN | 104301610 A | 1/2015 |
| CN | 105468283 A | 4/2016 |
| CN | 106126718 A | 11/2016 |
| CN | 106230946 A | 12/2016 |
| CN | 107277274 A | 10/2017 |
| CN | 107329645 A | 11/2017 |
| CN | 305396671 S | 10/2019 |
| CN | 112506403 A | 3/2021 |
| JP | 2006072858 A | 3/2006 |

OTHER PUBLICATIONS

Chinese First Office Action, mailed Dec. 22, 2021, from Chinese App. No. 202011381996.7, 28 pages.
Chinese Second Office Action, mailed Nov. 10, 2022, from Chinese App. No. 202011381996.7, 30 pages.
Chinese Third Office Action, mailed Jun. 1, 2023 from Chinese App. No. 202011381996.7, 24 pages.
Chinese Decision on Rejection, mailed Sep. 28, 2023 from Chinese App. No. 202011381996.7, 27 pages.

* cited by examiner

SMART INTERACTIVE BOARD, DISPLAY METHOD THEREFOR, AND READABLE STORAGE MEDIUM

CROSS REFERENCE TO RELATED APPLICATION

The present disclosure is a National Stage of International Application No. PCT/CN2021/123101, filed on Oct. 11, 2021, which claims the benefit of priority to Chinese patent application No. 202011381996.7, filed to the Chinese patent office on Nov. 30, 2020 and entitled "Intelligent interactive flat panel, display method thereof and readable storage medium", both of which are incorporated in the present disclosure in their entireties by reference.

FIELD

The present disclosure relates to the technical field of display, in particular to an intelligent interactive flat panel, a display method thereof and a readable storage medium.

BACKGROUND

At present, while intelligent interactive flat panels such as conferencing machines are increasingly available in the market, specialized software to save autographs and group photos of participants after conferences are unavailable.

SUMMARY

An embodiment of the present disclosure provides a display method of an intelligent interactive flat panel. The method includes:
controlling, upon receiving a corresponding operation instruction of a user, the intelligent interactive flat panel to be switched to a time axis reminder interface, displaying a time axis and a newly-built autograph wall icon on the time axis reminder interface, and displaying thumbnails corresponding to stored reminder information on the time axis in time sequence, the reminder information at least including a photo and reminder time;
switching, upon receiving an instruction that a user selects the newly-built autograph wall icon, the intelligent interactive flat panel to a newly-built autograph wall interface, the autograph wall interface including a photo adding interface; and
switching, upon receiving an instruction that a user saves the autograph wall interface, the intelligent interactive flat panel to the time axis reminder interface, and displaying thumbnails corresponding to reminder information contained in the autograph wall interface on the time axis reminder interface.

In a possible implementation, in the above method provided in an embodiment of the present disclosure, the reminder information further includes an autograph; and
the autograph wall interface further includes an autograph adding interface, and the autograph adding interface and the photo adding interface are sequentially or simultaneously displayed.

In a possible implementation, in the above method provided in an embodiment of the present disclosure, the corresponding operation instruction of a user includes sliding, by a user, in a specified direction, an interface displayed by the intelligent interactive flat panel.

In a possible implementation, the above method provided in an embodiment of the present disclosure further includes:
displaying, upon receiving a first operation instruction of a user on a thumbnail selected from the time axis reminder interface, by the intelligent interactive flat panel an enlarged selected thumbnail.

In a possible implementation, the above method provided in an embodiment of the present disclosure further includes:
switching, upon receiving a second operation instruction of a user on a thumbnail selected from the time axis reminder interface, the intelligent interactive flat panel to autograph wall interface corresponding to the selected thumbnail, so as to modify reminder information contained in the autograph wall interface.

In a possible implementation, in the above method provided in an embodiment of the present disclosure, the photo adding interface includes a photographing icon. The method further includes:
switching, upon receiving an instruction that a user selects the photographing icon, the intelligent interactive flat panel to a photographing interface, the photographing interface displaying an image obtained by a camera, a photographing button and an exit button in real time.

In a possible implementation, in the above method provided in an embodiment of the present disclosure, the photographing interface further displays a countdown photographing button.

The method further includes: starting, upon receiving an instruction that a user selects the countdown photographing button, a countdown photographing mode, and displaying a countdown photographing duration selected by a user; and
superposing, upon receiving an instruction that a user selects the countdown photographing button, current countdown before photographing on the image obtained by the camera on the photographing interface in real time, and obtaining, in response to the countdown being zero, a photo formed by the image.

In a possible implementation, in the above method provided in an embodiment of the present disclosure, the photo adding interface includes a photo uploading icon. The method further includes:
displaying, upon receiving an instruction that a user selects the photo uploading icon, by the intelligent interactive flat panel a scanning and uploading link picture, the scanning and uploading link picture being used for establishing communication with a mobile terminal so as to upload a photo.

In a possible implementation, in the above method provided in an embodiment of the present disclosure, the photo adding interface includes a local photo adding icon. The method further includes:
displaying, upon receiving an instruction that a user selects the local photo adding icon, by the intelligent interactive flat panel an input box for photo addition, the input box being used for establishing communication with a local storage device so as to add a photo.

In a possible implementation, the above method provided in an embodiment of the present disclosure further includes:
displaying, upon receiving a first instruction of a user on a photo selected from the photo adding interface, by the intelligent interactive flat panel an enlarged selected photo.

In a possible implementation, in the above method provided in an embodiment of the present disclosure, a cover photo is set at a position of a first photo displayed in the photo adding interface, and photos are displayed at positions of other photos in reverse time sequence of saving, and the cover photo is used as the thumbnail.

The method further includes:

displaying, upon receiving a second instruction of a user on a photo selected from the photo adding interface, by the intelligent interactive flat panel a delete button and a cover setting button on an outer side of the selected photo;

displaying, upon receiving an instruction that a user selects the delete button, by the intelligent interactive flat panel an input box for deleting a photo or not, and deleting, upon receiving an instruction that a user selects "delete" from the input box, the selected photo from the photo adding interface; and moving, upon receiving an instruction that a user selects the cover setting button, by the intelligent interactive flat panel the selected photo to the position of the first photo in the photo adding interface and set the selected photo as the cover photo.

In a possible implementation, in the above method provided in an embodiment of the present disclosure, upon receiving the instruction that a user saves the autograph wall interface, the method further includes:

displaying, by the intelligent interactive flat panel an input box for inputting a theme name; and switching, upon receiving an instruction that a user selects "confirm" from the input box, the intelligent interactive flat panel to the time axis reminder interface, the time axis reminder interface further displaying theme names corresponding to the stored reminder information.

In a possible implementation, in the above method provided in an embodiment of the present disclosure, the autograph wall interface further includes a return icon.

The method further includes:

switching, upon receiving an instruction that a user selects the return icon, the intelligent interactive flat panel to the time axis reminder interface.

In a possible implementation, in the above method provided in an embodiment of the present disclosure, the time axis reminder interface alternately displays thumbnails corresponding to the stored reminder information on two sides of the time axis in reverse time sequence.

In a possible implementation, in the above method provided in an embodiment of the present disclosure, in response to a quantity of the thumbnails corresponding to the stored reminder information being greater than a set number, the time axis reminder interface hides some of the thumbnails on the time axis; and upon receiving an instruction that a user slides the time axis, hidden thumbnails are displayed on the time axis.

In another aspect, an embodiment of the present disclosure further provides an intelligent interactive flat panel. The intelligent interactive flat panel includes: a display screen, a camera and a drive circuit.

The drive circuit switches, upon receiving a corresponding operation instruction of a user, the intelligent interactive flat panel to a time axis reminder interface, a time axis and a newly-built autograph wall icon are displayed on the time axis reminder interface, and thumbnails corresponding to stored reminder information are displayed on the time axis in time sequence, the reminder information at least including a photo and reminder time; the drive circuit switches, upon receiving an instruction that a user selects the newly-built autograph wall icon, the intelligent interactive flat panel to a newly-built autograph wall interface, the autograph wall interface including a photo adding interface; and the drive circuit switches, upon receiving an instruction that a user saves the autograph wall interface, the intelligent interactive flat panel to the time axis reminder interface, and thumbnails corresponding to reminder information contained in the autograph wall interface are displayed on the time axis reminder interface.

In another aspect, an embodiment of the present disclosure further provides an intelligent interactive flat panel. The intelligent interactive flat panel includes:

at least one processor, and a memory connected to the at least one processor; where the memory stores instructions that may be executed by the at least one processor, and the at least one processor executes the above display method by executing the instructions stored in the memory.

In another aspect, an embodiment of the present disclosure further provides a readable storage medium. The readable storage medium includes a memory, where the memory is used for storing instructions, and when executed by a processor, the instructions cause an apparatus including the readable storage medium to complete the above display method.

DETAILED DESCRIPTION OF THE EMBODIMENTS

In order to make the objectives, technical solutions and advantages of the present disclosure more obvious, the present disclosure will be described in detail below in conjunction with the accompanying drawings, and obviously, the described embodiments are some, rather than all of the embodiments of the present disclosure. On the basis of the embodiments of the present disclosure, all other embodiments obtained by those of ordinary skill in the art without making creative efforts fall within the scope of protection of the present disclosure.

Shapes and sizes of all components in the accompanying drawings do not reflect true scale and are merely intended to illustrate the contents of the present disclosure.

Figures 1, 2, 3, 4:
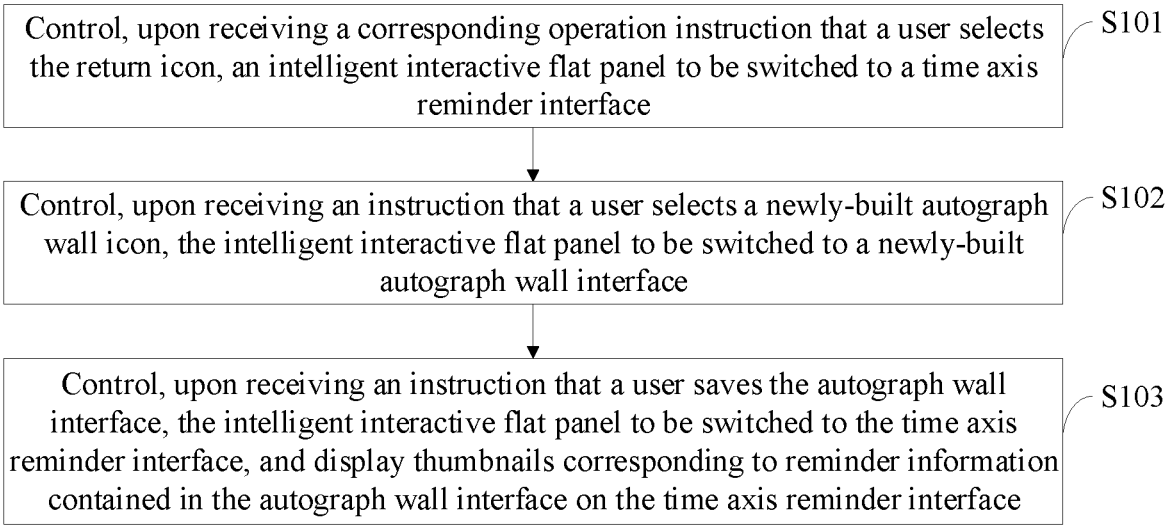
FIG. 1 is a flow diagram of a display method of an intelligent interactive flat panel provided in an embodiment of the present disclosure.
FIG. 2 is another flow diagram of a display method of an intelligent interactive flat panel provided in an embodiment of the present disclosure.
FIG. 3 is yet another flow diagram of a display method of an intelligent interactive flat panel provided in an embodiment of the present disclosure.
FIG. 4 is yet another flow diagram of a display method of an intelligent interactive flat panel provided in an embodiment of the present disclosure.

An embodiment of the present disclosure provides a display method of an intelligent interactive flat panel. As shown in FIG. 1, the method includes the following steps.

Figure 12:
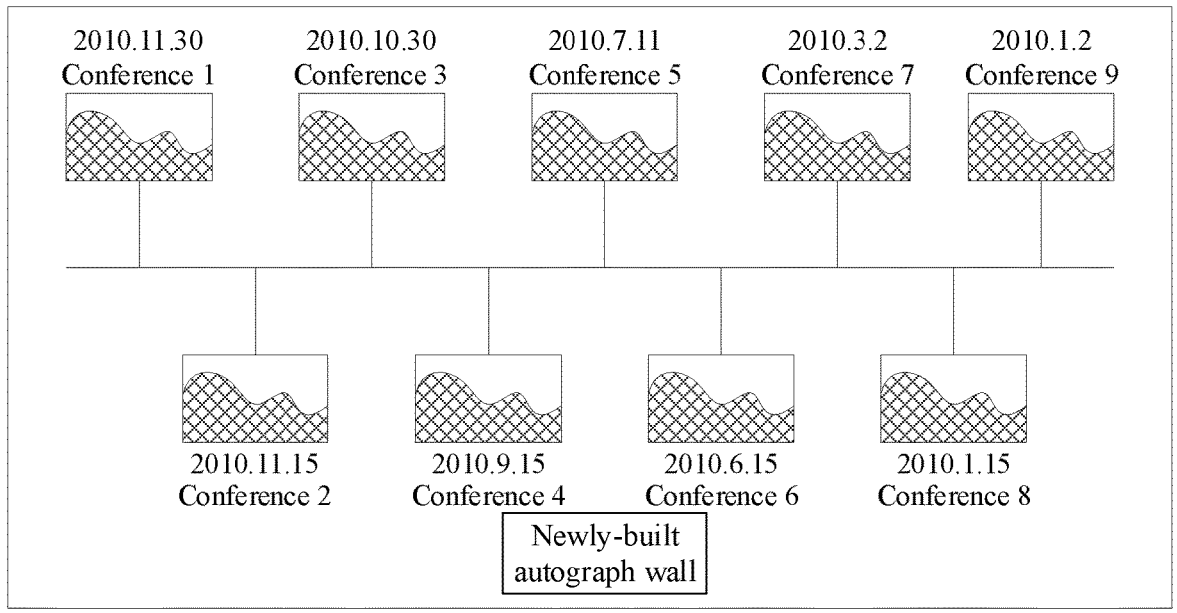
FIG. 12 is a schematic diagram of a time axis reminder interface displayed by an intelligent interactive flat panel provided in an embodiment of the present disclosure.

S101: control, upon receiving a corresponding operation instruction of a user, the intelligent interactive flat panel to be switched to a time axis reminder interface. As shown in FIG. 12, a time axis and a newly-built autograph wall icon are displayed on the time axis reminder interface, and thumbnails corresponding to stored reminder information are displayed on the time axis in time sequence, the reminder information at least including a photo and reminder time, and "switch" meaning start and display.

Figure 14:
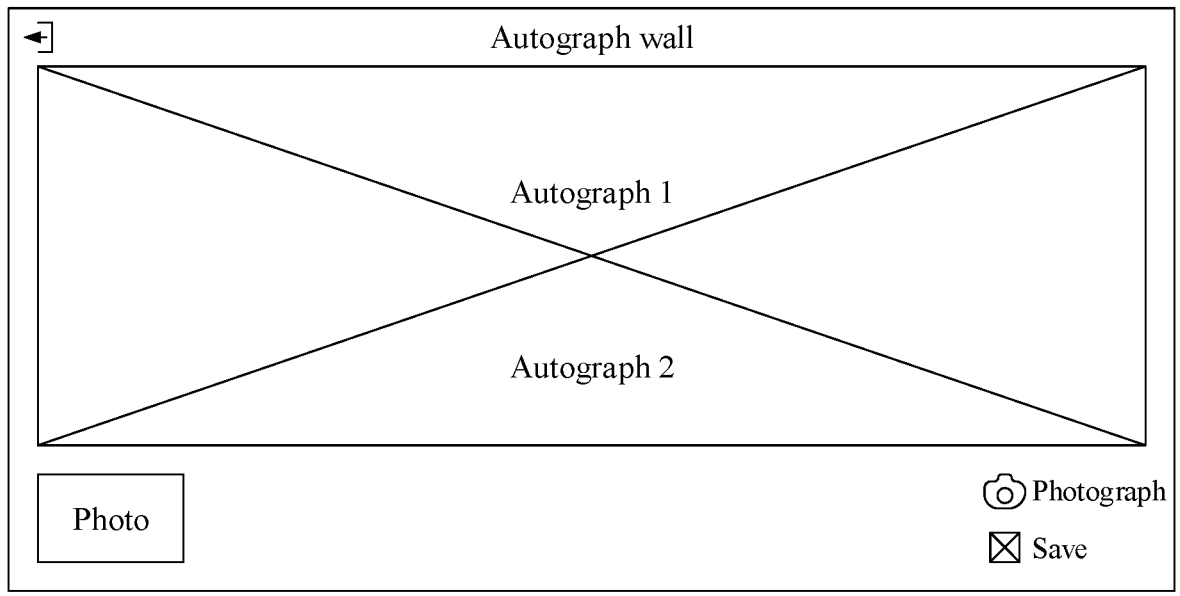
FIG. 14 is a schematic diagram of an autograph wall interface displayed by an intelligent interactive flat panel provided in an embodiment of the present disclosure.

S102: Control, upon receiving an instruction that a user selects the newly-built autograph wall icon, the intelligent interactive flat panel to be switched to a newly-built autograph wall interface. As shown in FIG. 14, the autograph wall interface may include a photo adding interface.

S103: Control, upon receiving an instruction that a user saves the autograph wall interface, the intelligent interactive flat panel to be switched to the time axis reminder interface, and display thumbnails corresponding to reminder information contained in the autograph wall interface on the time axis reminder interface.

Intelligent interactive flat panel refers to a large-size (50 inches or above) display device with touch interaction, handwriting input, screen projection and other functions. The intelligent interactive flat panel may be applied to commerce, education, conference, exhibition and other scenes. The intelligent interactive flat panel may be a conferencing machine, an education machine, an electronic blackboard, an electronic whiteboard and other devices.

The display method of an intelligent interactive flat panel provided in an embodiment of the present disclosure may display stored reminder information containing photos in time sequence, facilitate use of the intelligent interactive flat panel, and increase practical functions.

In some embodiments, in the above step S101, in the case that the intelligent interactive flat panel supports the touch interaction function, the corresponding operation instruction of a user may include an instruction that the user slides a display interface of the intelligent interactive flat panel in a specified direction. For example, when the user slides the display interface upwards, it is determined that an instruction of switching to the time memory interface is required to be executed; or the corresponding operation instruction of a user may further include an instruction that the user clicks a certain icon on the display interface, for example, the user clicks an icon representing a time axis reminder interface.

It should be noted that in the display method provided in an embodiment of the present disclosure, names of all the icons and buttons are used for representing actual functions thereof on corresponding interfaces, and do not represent actual appearances thereof, and external forms of the icons and buttons may be represented by some specific representative pictures or words, which is not limited herein.

In some embodiments, the time axis reminder interface may display a time axis from left to right according to viewing habits, and may alternately display thumbnails corresponding to stored reminder information on two sides (upper and lower sides) of the time axis in reverse time sequence. The thumbnails are displayed in reverse time sequence, that is, the thumbnail having latest reminder time is placed on a left side, which is convenient for viewers to view reminder information therein. When the number of the thumbnails corresponding to the stored reminder information is greater than a set number, the time axis reminder interface may hide some of the thumbnails on the time axis, for example, may hide the thumbnails having earlier reminder time on a right side; and may display the hidden thumbnails on the time axis upon receiving an instruction that a user slides the time axis, for example, may display the hidden thumbnails having earlier reminder time on the right side of the time axis when an instruction that a user slides the time axis towards the left is received.

In some embodiments, each thumbnail represents one piece of reminder information, each piece of reminder information may contain a plurality of photos, and each photo may be added in a newly-built autograph wall interface corresponding to the thumbnail, or may be added during subsequent modification, which is not limited herein.

Figure 13:
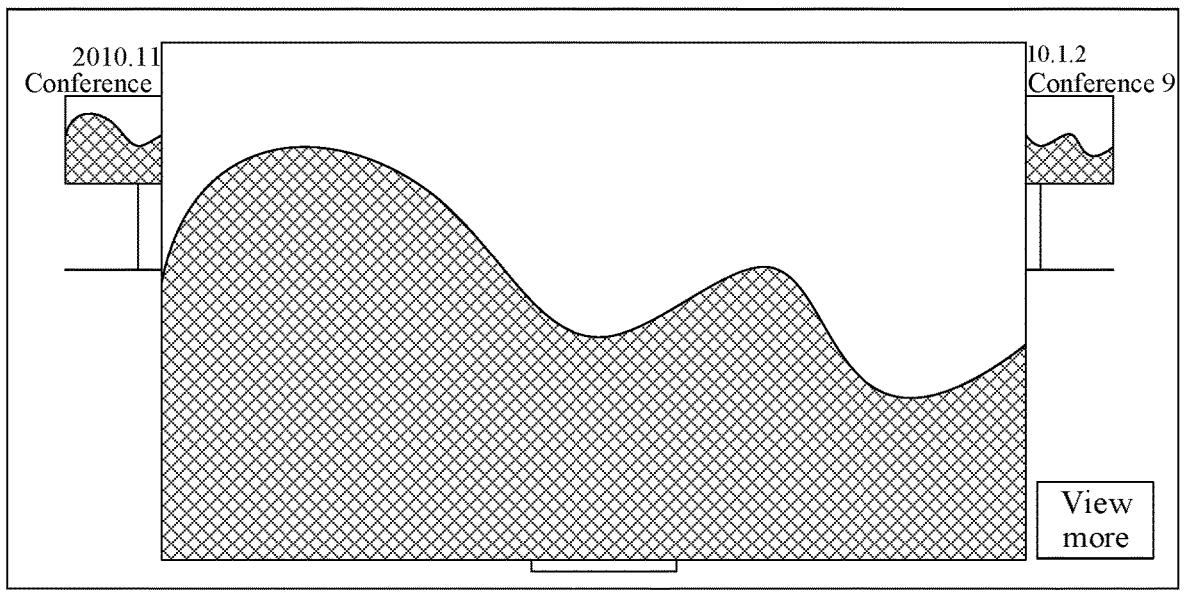
FIG. 13 is another schematic diagram of a time axis reminder interface displayed by an intelligent interactive flat panel provided in an embodiment of the present disclosure.

Optionally, the above method provided in an embodiment of the present disclosure, as shown in FIG. 2, further includes:

S201: control, upon receiving a first operation instruction of a user on a thumbnail selected from a time axis reminder interface, an intelligent interactive flat panel to display an enlarged selected thumbnail such that the user may conveniently browse the reminder information corresponding to the thumbnail. In some embodiments, the first operation instruction may be an operation of clicking a certain thumbnail. Further, as shown in FIG. 13, an enlarged thumbnail may be displayed in a middle of a screen, and the thumbnail may be a certain photo in the reminder information, for example, a cover photo. If the reminder information contains a plurality of photos, the photos may be sequentially switched to be circularly displayed by clicking the photos or clicking a "view more" button. If a user clicks the other positions on the screen, the thumbnails may be restored to finish browsing the photos, and the screen may be switched back to the time axis reminder interface.

Optionally, the above method provided in an embodiment of the present disclosure, as shown in FIG. 3, further includes:

S301: control, upon receiving a second operation instruction of a user on a thumbnail selected from the time axis reminder interface, the intelligent interactive flat panel to be switched to autograph wall interface corresponding to the selected thumbnail, so as to modify reminder information contained in the autograph wall interface. In some embodiments, the second operation instruction may be an operation of long clicking a certain thumbnail, and then the flat panel may enter the autograph wall interface corresponding to the thumbnail such that a user may modify reminder information in this interface, for example, delete a certain photo or add a photo, etc. It should be noted that modifying reminder information corresponding to an existing thumbnail does not change a position of the thumbnail on the time axis, that is, the thumbnails are sequenced on the time axis according to first storage time.

In some embodiments, in the above step S102, a user may create new reminder information by clicking a newly-built autograph wall icon displayed on the time axis reminder interface, and at least one photo may be added in the photo adding interface in the newly-built autograph wall interface.

Figure 15:
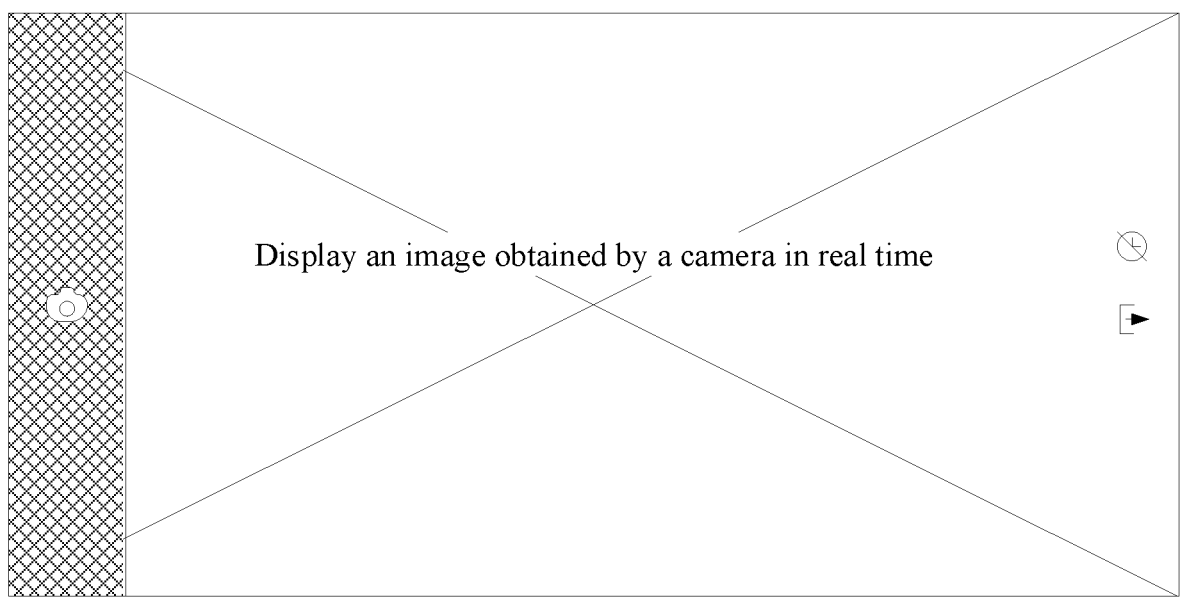
FIG. 15 is a schematic diagram of a photographing interface displayed by an intelligent interactive flat panel provided in an embodiment of the present disclosure.

Optionally, in the above method provided in an embodiment of the present disclosure, the reminder information may further include an autograph, and correspondingly, the autograph wall interface may further include an autograph adding interface, and the autograph adding interface and the photo adding interface may be sequentially or simultaneously displayed. For example, after the flat panel enters the autograph wall interface, the photographing interface of the photo adding interface may be displayed first. As shown in FIG. 15, after a user uploads a photo in a photographing manner, the flat panel is switched to a next interface. As shown in FIG. 14, the autograph adding interface and the photo adding interface are simultaneously displayed in this interface, that is, in a certain area (for example, an upper part) of a screen displays the autograph adding interface such that a user may add (single-person or multi-person) autographs through handwriting input or other methods, and another area (for example, a lower part) of the screen displays the photo adding interface, photos added by a user may be displayed in this interface, and photos may be added through at least one method. For another example, after the flat panel enters the autograph wall interface, the autograph adding interface and the photo adding interface may be directly simultaneously displayed, which is not limited herein.

Optionally, in the above method provided in an embodiment of the present disclosure, a camera carried by the intelligent interactive flat panel may be used to take a photo to upload the photo. In some embodiments, as shown in FIG. 14, the photo adding interface may include a photographing icon. Correspondingly, as shown in FIG. 4, the method may further include:

S401: control, upon receiving an instruction that a user selects a photographing icon, an intelligent interactive flat panel to be switched to a photographing interface.

The photographing interface displays an image obtained by a camera, a photographing button and an exit button in real time. For example, as shown in FIG. 15, the photographing button may be arranged on a left side of an image, and the exit button may be arranged on a right side of the image.

Figure 17:
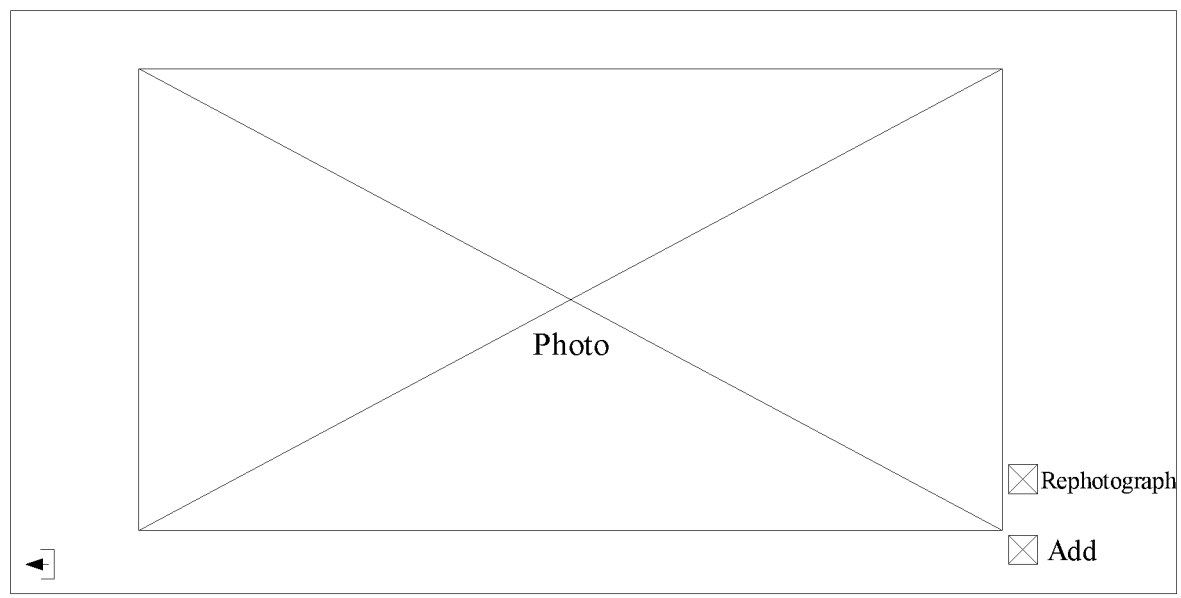
FIG. 17 is a schematic diagram of a photo interface displayed by an intelligent interactive flat panel provided in an embodiment of the present disclosure.

In some embodiments, upon receiving an instruction that a user selects the photographing button, the intelligent interactive flat panel may be controlled to be switched to the photographing interface. As shown in FIG. 17, the photographing interface may include a photo formed by a current image obtained by a camera, a rephotograph icon, an add icon, an exit icon, etc. Upon receiving an instruction that a user selects the rephotograph icon, the intelligent interactive flat panel may be controlled to be switched to the photographing interface for re-photographing. Upon receiving an instruction that a user selects the add icon, the intelligent interactive flat panel may be controlled to be switched to the photo adding interface of the autograph wall interface to add a photo at the photo adding interface of the autograph wall interface. Upon receiving an instruction that a user selects the exit icon, the intelligent interactive flat panel may be controlled to be switched to the photo adding interface of the autograph wall interface, that is, to exit photographing.

Figure 5:
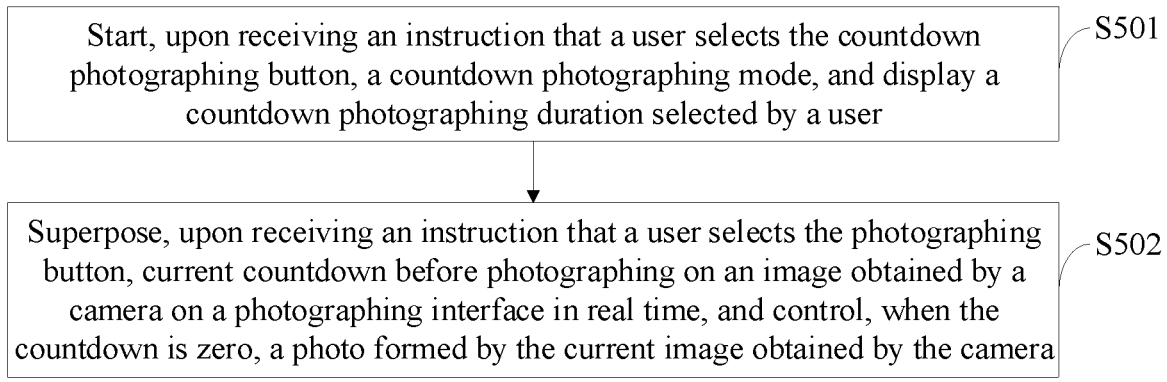
FIG. 5 is yet another flow diagram of a display method of an intelligent interactive flat panel provided in an embodiment of the present disclosure.
Figure 16:
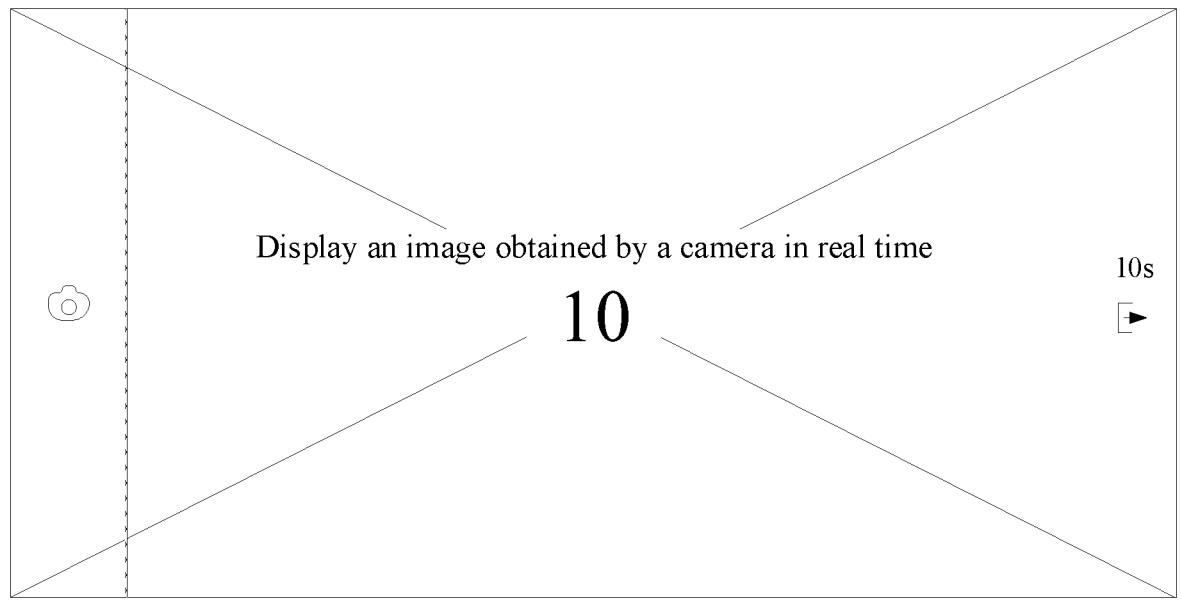
FIG. 16 is another schematic diagram of a photographing interface displayed by an intelligent interactive flat panel provided in an embodiment of the present disclosure.

Optionally, in the above method provided in an embodiment of the present disclosure, a countdown photographing button may be further displayed on the photographing interface, and the countdown photographing button is turned off in a default state, that is, a countdown photographing mode is not used. For example, as shown in FIG. 16, the countdown photographing button and the exit button may be simultaneously set on a right side of an image. Correspondingly, as shown in FIG. 5, the method may further include:

S501: start, upon receiving an instruction that a user selects a countdown photographing button, a countdown photographing mode, and display a countdown photographing duration selected by a user. For example, "10 s" set by default may be displayed at the countdown photographing button, and the user may click the countdown photographing button to adjust countdown, for example, countdown may be preset as 5 s, 10 s or 15 s, and the countdown may be adjusted once after the user clicks the countdown photographing button each time;

S502: superpose, upon receiving an instruction that a user selects the countdown photographing button, as shown in FIG. 16, current countdown before photographing on an image obtained by a camera on a photographing interface in real time, and control, when the countdown is zero, a photo formed by the current image obtained by the camera. For example, if a user selects countdown of 10 s for photographing, countdown numbers of 10, 9, 8, . . . , etc. will be superposed on the image in a time-sharing manner.

Figure 6:
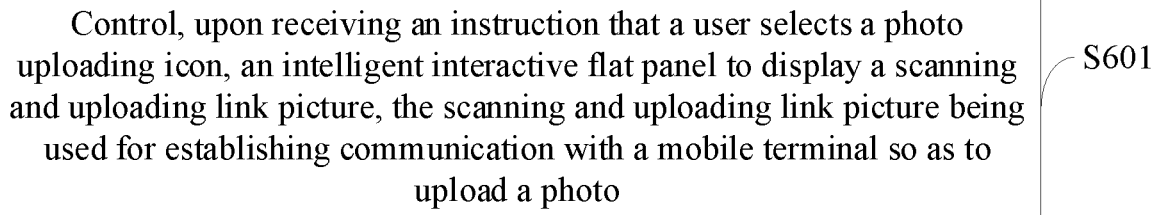
FIG. 6 is yet another flow diagram of a display method of an intelligent interactive flat panel provided in an embodiment of the present disclosure.

Optionally, in the above method provided in an embodiment of the present disclosure, a photo may also be uploaded through interaction with other mobile terminals. In some embodiments, the photo adding interface may include a photo uploading icon. Correspondingly, as shown in FIG. 6, the method further includes:

S601: control, upon receiving an instruction that a user selects a photo uploading icon, the intelligent interactive flat panel to display a scanning and uploading link picture. The scanning and uploading link picture is used for establishing communication with a mobile terminal so as to upload a photo. For example, a two-dimensional code picture may be displayed, and then a user may establish a communication channel with the intelligent interactive flat panel through mobile phone scanning to upload a photo stored in a mobile phone or taken by the mobile phone.

Figure 7:
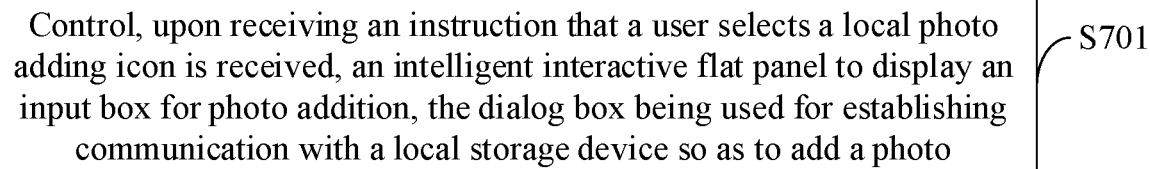
FIG. 7 is yet another flow diagram of a display method of an intelligent interactive flat panel provided in an embodiment of the present disclosure.

Optionally, in the above method provided in an embodiment of the present disclosure, a photo may also be uploaded through interaction with external memories. In some embodiments, the photo adding interface may include a local photo adding icon. Correspondingly, as shown in FIG. 7, the method further includes:

S701: control, upon receiving an instruction that a user selects a local photo adding icon is received, the intelligent interactive flat panel to display an input box for photo addition. The input box is used for establishing communication with a local storage device so as to add a photo. For example, after a mobile hard disc is mounted on an external interface of the intelligent interactive flat panel, a path of the mobile hard disc may be selected to add a photo in the input box for photo addition.

Figure 8:
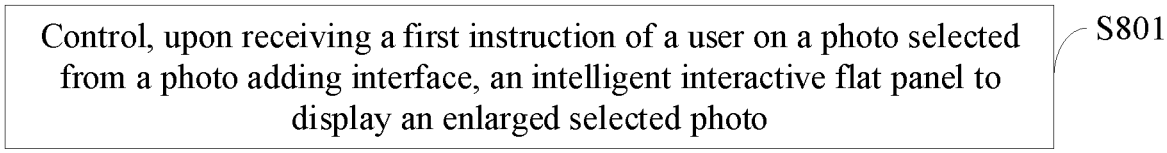
FIG. 8 is yet another flow diagram of a display method of an intelligent interactive flat panel provided in an embodiment of the present disclosure.

Optionally, in the above method provided in an embodiment of the present disclosure, a plurality of photos may be added to the photo adding interface according to user requirements, and if a certain photo existing in the photo adding interface is to be viewed, as shown in FIG. 8, the method may further include:

S801: control, upon receiving a first instruction of a user on a selected photo in a photo adding interface, an intelligent interactive flat panel to display an enlarged selected photo. In some embodiments, the first instruction may be an operation of clicking a certain photo, and then, the enlarged photo may be displayed in a middle of a screen, and if a user clicks other positions of the screen, the photo may be restored to finish browsing the photos.

Figure 9:
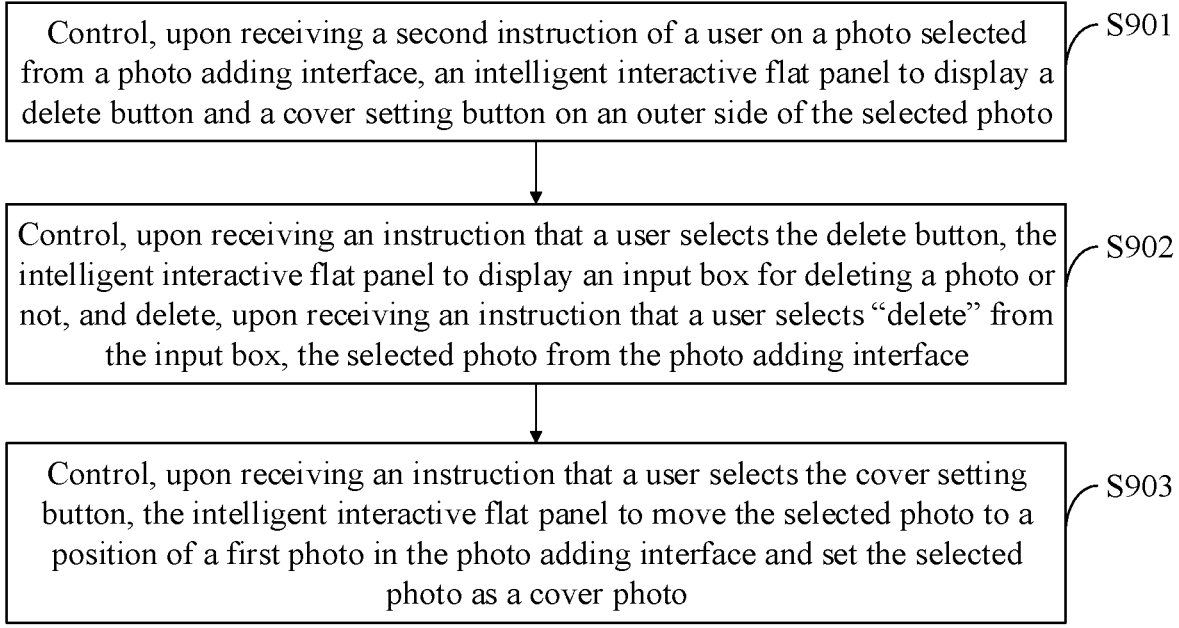
FIG. 9 is yet another flow diagram of a display method of an intelligent interactive flat panel provided in an embodiment of the present disclosure.
Figure 18:
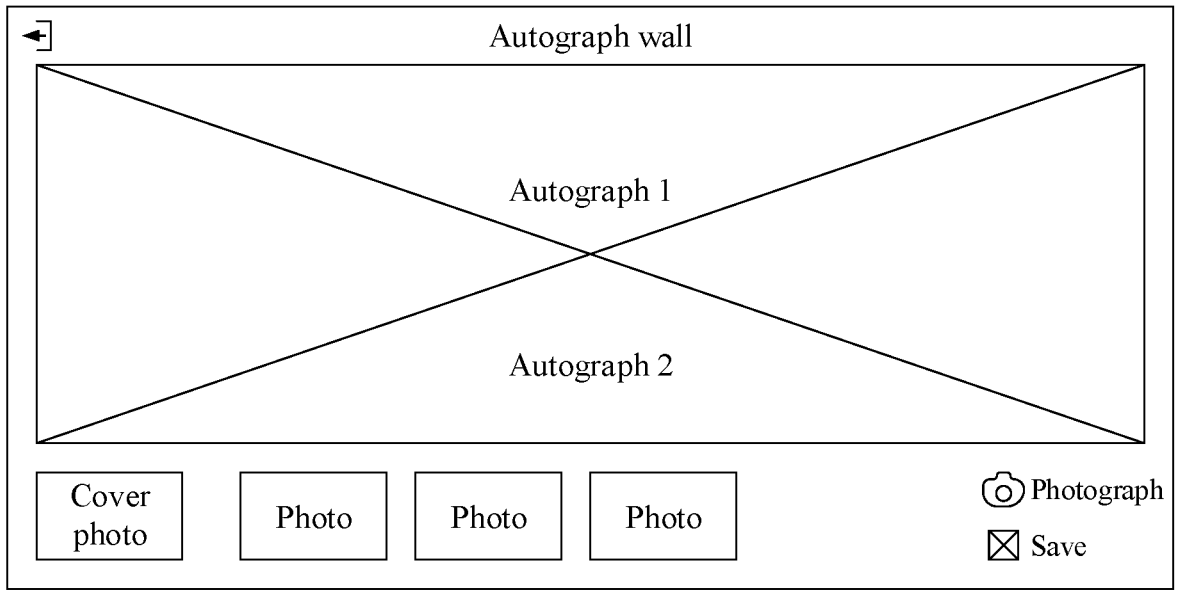
FIG. 18 is another schematic diagram of an autograph wall interface displayed by an intelligent interactive flat panel provided in an embodiment of the present disclosure.
Figure 19:
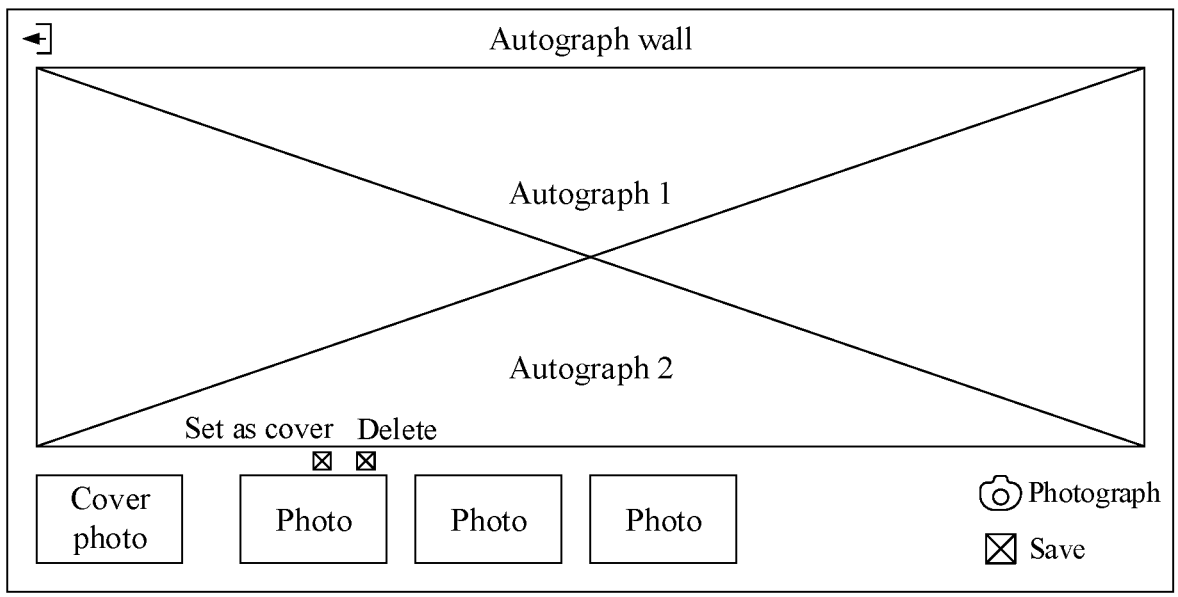
FIG. 19 is yet another schematic diagram of an autograph wall interface displayed by an intelligent interactive flat panel provided in an embodiment of the present disclosure.
Figure 20:
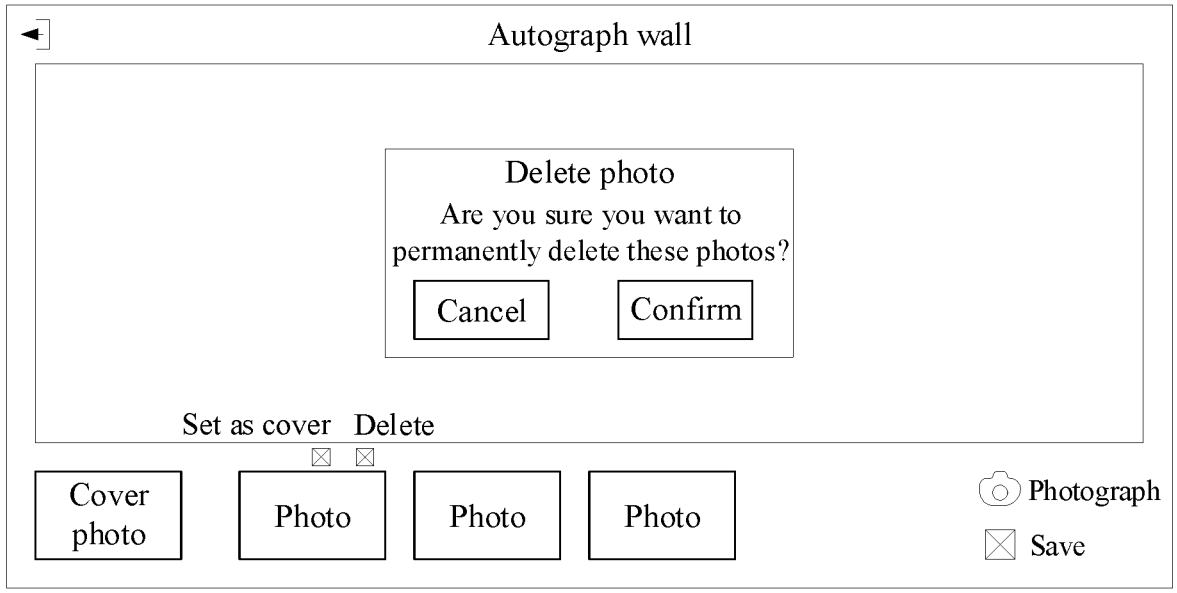
FIG. 20 is yet another schematic diagram of an autograph wall interface displayed by an intelligent interactive flat panel provided in an embodiment of the present disclosure.

Optionally, in the above method provided in an embodiment of the present disclosure, for a plurality of photos in the photo adding interface, a cover photo is set at a position of a first photo displayed in the photo adding interface. As shown in FIG. 18, for example, a leftmost photo is considered as a first photo, photos are displayed at positions of other photos in reverse time sequence of saving, and specifically, the cover photo is used as the thumbnail. Correspondingly, as shown in FIG. 9, the method may further include:

S901: control, upon receiving a second instruction of a user on a photo selected in a photo adding interface, an intelligent interactive flat panel to display a delete button and a cover setting button on an outer side of the selected photo. In some embodiments, the second instruction may be an operation instruction of long pressing a certain photo, and then, as shown in FIG. 19, a delete button and a cover setting button may pop up above the photo;

S902: Control, upon receiving an instruction that a user selects the delete button, as shown in FIG. 20, the intelligent interactive flat panel to display an input box for deleting a photo or not, and delete, upon receiving an instruction that a user selects "delete" from the input box, the selected photo from the photo adding interface;

S903: Control, upon receiving an instruction that a user selects the cover setting button, the intelligent interactive flat panel to move the selected photo to a position of a first photo in the photo adding interface and set the selected photo as a cover photo.

Figure 10:
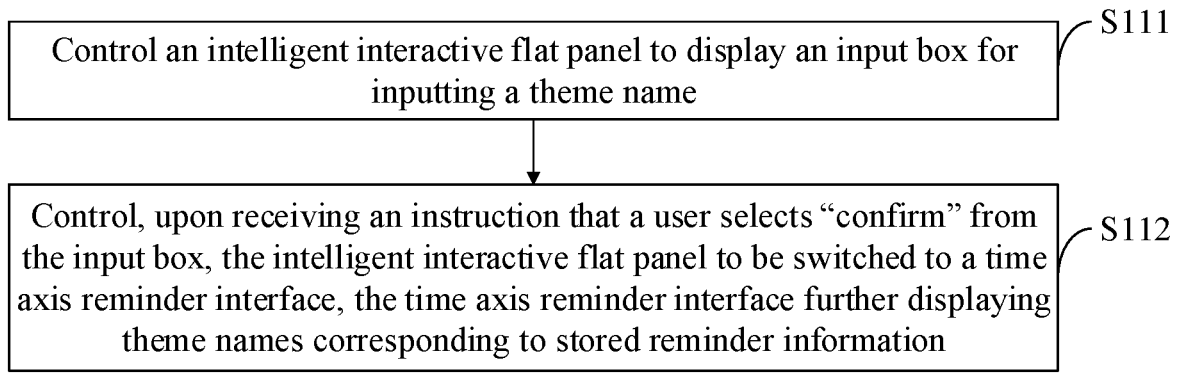
FIG. 10 is yet another flow diagram of a display method of an intelligent interactive flat panel provided in an embodiment of the present disclosure.
Figure 21:
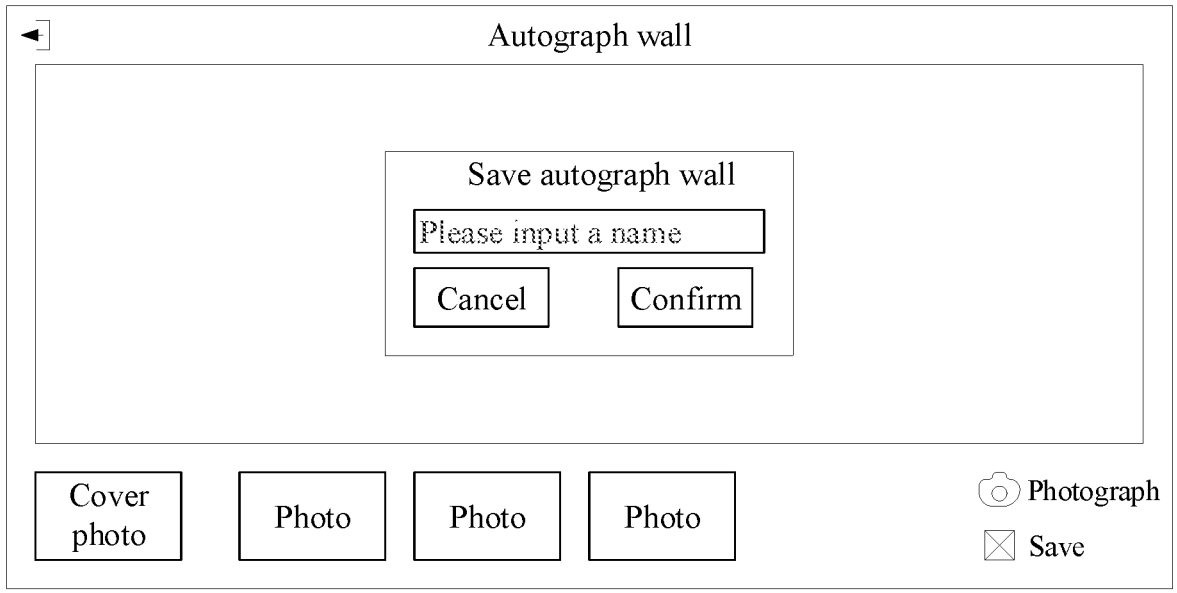
FIG. 21 is yet another schematic diagram of an autograph wall interface displayed by an intelligent interactive flat panel provided in an embodiment of the present disclosure.

Optionally, in the above method provided in an embodiment of the present disclosure, after the operation on the autograph wall interface is completed, upon receiving the instruction that a user saves the autograph wall interface, the above step S103, as shown in FIG. 10, may further include:

S111: control an intelligent interactive flat panel to display an input box for inputting a theme name, which is as shown in FIG. 21;

S112: Control, upon receiving an instruction that a user selects "confirm" from the input box, the intelligent interactive flat panel to be switched to a time axis reminder interface. The time axis reminder interface further displays theme names corresponding to stored reminder information, which is as shown in FIG. 12.

Figure 11:
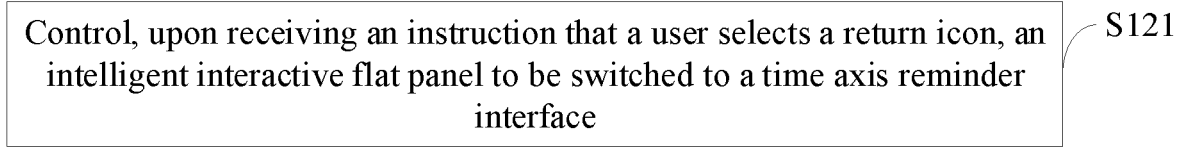
FIG. 11 is yet another flow diagram of a display method of an intelligent interactive flat panel provided in an embodiment of the present disclosure.

Optionally, in the above method provided in an embodiment of the present disclosure, the autograph wall interface may further include a return icon. Correspondingly, if a user wants to cancel an operation of adding an autograph wall interface, as shown in FIG. 11, the method may further include:

S121: control, upon receiving an instruction that a user selects a return icon, an intelligent interactive flat panel to be switched to a time axis reminder interface.

On the basis of the same application concept, an embodiment of the present disclosure further provides an intelligent interactive flat panel. Since a principle of the intelligent interactive flat panel for solving problems is similar to the aforementioned display method of an intelligent interactive flat panel, implementation of the intelligent interactive flat panel may refer to implementation of the method, and the same description will not be repeated.

An embodiment of the present disclosure provides an intelligent interactive flat panel. The intelligent interactive flat panel includes: a display screen, a camera and a drive circuit.

The drive circuit controls, upon receiving a corresponding operation instruction of a user, the intelligent interactive flat panel to be switched to a time axis reminder interface, a time axis and a newly-built autograph wall icon are displayed on the time axis reminder interface, and thumbnails corresponding to stored reminder information are displayed on the time axis in time sequence, the reminder information at least including a photo and reminder time; the drive circuit controls, upon receiving an instruction that a user selects the newly-built autograph wall icon, the intelligent interactive flat panel to be switched to a newly-built autograph wall interface, the autograph wall interface including a photo adding interface; and the drive circuit controls, upon receiving an instruction that a user saves the autograph wall interface, the intelligent interactive flat panel to be switched to the time axis reminder interface, and thumbnails corresponding to reminder information contained in the autograph wall interface are displayed on the time axis reminder interface.

On the basis of the same application concept, an embodiment of the present disclosure further provides an intelligent interactive flat panel. The intelligent interactive flat panel includes:

at least one processor, and
a memory connected to the at least one processor; where the memory stores instructions that may be executed by the at least one processor, and the at least one processor executes the above display method by executing the instructions stored in the memory.

On the basis of the same application concept, an embodiment of the present disclosure further provides a readable storage medium. The readable storage medium includes a memory, where the memory is used for storing instructions, and when executed by a processor, the instructions cause an apparatus including the readable storage medium to complete the above display method.

Those skilled in the art should understand that the embodiments of the present disclosure may be provided as methods, systems, or computer program products. Therefore, the present disclosure may employ full hardware embodiments, full software embodiments, or software and hardware combined embodiments. Moreover, the present disclosure may take the form of a computer program product implemented on one or more computer usable storage media (including, but not limited to, disc memories, compact disc read-only memories (CD-ROMs), optical memories, etc.) containing computer usable program codes.

The present disclosure is described with reference to flow diagrams and/or block diagrams of methods, devices (systems), and computer program products according to the present disclosure. It should be understood that each flow and/or block in the flow diagrams and/or block diagrams and combinations of the flows and/or blocks in the flow diagrams and/or block diagrams may be implemented by computer program instructions. These computer program instructions may be provided for a processor of a general-purpose computer, a special-purpose computer, an embedded processor, or other programmable data processing devices to produce a machine, such that instructions executed by the processor of the computer or other programmable data processing devices produce an apparatus used for implementing specified functions in one or more flows of each flow diagram and/or one or more blocks of each block diagram.

These computer program instructions may also be stored in a computer readable memory that may guide a computer or other programmable data processing devices to work in a specific manner, such that the instructions stored in the computer readable memory produce an article of manufacture including an instruction apparatus, and the instruction apparatus implements specified functions in one or more flows of each flow diagram and/or one or more blocks in each block diagram.

These computer program instructions may be loaded onto a computer or another programmable data processing device, such that a series of operations and steps are executed on the computer or the another programmable device, thereby generating computer-implemented processing. Therefore, the instructions executed on the computer or the another programmable device provide steps for implementing specific functions in one or more flows of each flow diagram and/or one or more blocks in each block diagram.

Apparently, those skilled in the art can make various modifications and variations to the present disclosure without departing from the spirit and scope of the present disclosure. In this way, if these modifications and variations of the present disclosure fall within the scope of the claims of the present disclosure and their equivalent technologies, the present disclosure is also intended to include these modifications and variations.

What is claimed is:

1. A display method of an intelligent interactive flat panel, comprising:

switching, upon receiving a corresponding operation instruction from a user, the intelligent interactive flat panel to a time axis reminder interface; displaying a time axis and a newly-built autograph wall icon on the time axis reminder interface, and displaying thumbnails corresponding to stored reminder information on the time axis in time sequence, the reminder information at least comprising a photo and a reminder time;

switching, upon receiving an instruction that a user selects the newly-built autograph wall icon, the intelligent interactive flat panel to a newly-built autograph wall interface, the autograph wall interface comprising a photo adding interface; and switching, upon receiving an instruction that a user saves the autograph wall interface, the intelligent interactive flat panel to the time axis reminder interface, and displaying thumbnails corresponding to reminder information contained in the autograph wall interface on the time axis reminder interface;

wherein the reminder information further comprises an autograph; and the autograph wall interface further comprises an autograph adding interface, and the autograph adding interface and the photo adding interface are sequentially or simultaneously displayed;

wherein a cover photo is set at a position of a first photo displayed in the photo adding interface, and photos are displayed at positions of other photos in reverse time sequence of saving, and the cover photo is used as the thumbnail; and the method further comprises:

displaying, upon receiving a second instruction of a user on a photo selected from the photo adding interface, by the intelligent interactive flat panel, a delete button and a cover setting button on an outer side of the selected photo;

displaying, upon receiving an instruction that a user selects the delete button, by the intelligent interactive flat panel, an input box for deleting a photo or not, and deleting, upon receiving an instruction that a user selects "delete" from the input box, the selected photo from the photo adding interface; and moving, upon receiving an instruction that a user selects the cover setting button, by the intelligent interactive flat panel, the selected photo to the position of the first photo in the photo adding interface and setting the selected photo as the cover photo.

2. The display method according to claim 1, wherein the corresponding operation instruction of a user comprises sliding in a specified direction, an interface displayed by the intelligent interactive flat panel.

3. The display method according to claim 1, further comprising:

controlling, upon receiving a first operation instruction of a user on a thumbnail selected from the time axis reminder interface, the intelligent interactive flat panel to display an enlarged selected thumbnail.

4. The display method according to claim 1, further comprising:

switching, upon receiving a second operation instruction of a user on a thumbnail selected from the time axis reminder interface, the intelligent interactive flat panel to an autograph wall interface corresponding to the selected thumbnail, so as to modify reminder information contained in the autograph wall interface.

5. The display method according to claim 1, wherein the photo adding interface comprises a photographing icon, and the method further comprises:

switching, upon receiving an instruction that a user selects the photographing icon, the intelligent interactive flat panel to a photographing interface, the photographing interface displaying an image obtained by a camera, a photographing button and an exit button in real time.

6. The display method according to claim 5, wherein the photographing interface further displays a countdown photographing button; and
the method further comprises: starting, upon receiving an instruction that a user selects the countdown photographing button, a countdown photographing mode, and displaying a countdown photographing duration selected by a user; and
superposing, upon receiving an instruction that a user selects the countdown photographing button, current countdown before photographing on an image obtained by the camera on the photographing interface in real time, and obtaining, by the camera, in response to the countdown being zero, a photo formed by the image.

7. The display method according to claim 1, wherein the photo adding interface comprises a photo uploading icon, and the method further comprises:
displaying, upon receiving an instruction that a user selects the photo uploading icon, by the intelligent interactive flat panel, a scanning and uploading link picture, the scanning and uploading link picture being used for establishing communication with a mobile terminal so as to upload a photo.

8. The display method according to claim 1, wherein the photo adding interface comprises a local photo adding icon, and the method further comprises:
displaying, upon receiving an instruction that a user selects the local photo adding icon, by the intelligent interactive flat panel, an input box for photo addition, the input box being used for establishing communication with a local storage device so as to add a photo.

9. The display method according to claim 1, further comprising:
displaying, upon receiving a first instruction of a user on a photo selected from the photo adding interface, by the intelligent interactive flat panel, an enlarged selected photo.

10. The display method according to claim 1, wherein upon receiving the instruction that a user saves the autograph wall interface, the method further comprises:
displaying, by the intelligent interactive flat panel, an input box for inputting a theme name; and
switching, upon receiving an instruction that a user selects "confirm" from the input box, the intelligent interactive flat panel to the time axis reminder interface, the time axis reminder interface further displaying theme names corresponding to the stored reminder information.

11. The display method according to claim 1, wherein the autograph wall interface further comprises a return icon; and the method further comprises:
switching, upon receiving an instruction that a user selects the return icon, the intelligent interactive flat panel to the time axis reminder interface.

12. The display method according to claim 1, wherein the time axis reminder interface alternately displays thumbnails corresponding to the stored reminder information on two sides of the time axis in reverse time sequence.

13. The display method according to claim 1, wherein in response to a quantity of the thumbnails corresponding to the stored reminder information is greater than a set number, the time axis reminder interface hides some of the thumbnails on the time axis; and
upon receiving an instruction that a user slides the time axis, hidden thumbnails are displayed on the time axis.

14. An intelligent interactive flat panel, comprising: a display screen, a camera and a drive circuit; wherein
the drive circuit switches, upon receiving a corresponding operation instruction of a user, the intelligent interactive flat panel to a time axis reminder interface, a time axis and a newly-built autograph wall icon are displayed on the time axis reminder interface, and thumbnails corresponding to stored reminder information are displayed on the time axis in time sequence, the reminder information at least comprising a photo and a reminder time; the drive circuit switches, upon receiving an instruction that a user selects the newly-built autograph wall icon, the intelligent interactive flat panel to a newly-built autograph wall interface, the autograph wall interface comprising a photo adding interface; and the drive circuit switches, upon receiving an instruction that a user saves the autograph wall interface, the intelligent interactive flat panel to the time axis reminder interface, and thumbnails corresponding to reminder information contained in the autograph wall interface are displayed on the time axis reminder interface; wherein the reminder information further comprises an autograph; and the autograph wall interface further comprises an autograph adding interface, and the autograph adding interface and the photo adding interface are sequentially or simultaneously displayed;
wherein a cover photo is set at a position of a first photo displayed in the photo adding interface, and photos are displayed at positions of other photos in reverse time sequence of saving, and the cover photo is used as the thumbnail; and
the drive circuit further displays, upon receiving a second instruction of a user on a photo selected from the photo adding interface, a delete button and a cover setting button on an outer side of the selected photo; displays, upon receiving an instruction that a user selects the delete button, an input box for deleting a photo or not, and deletes, upon receiving an instruction that a user selects "delete" from the input box, the selected photo from the photo adding interface; and moves, upon receiving an instruction that a user selects the cover setting button, the selected photo to the position of the first photo in the photo adding interface and sets the selected photo as the cover photo.

15. An intelligent interactive flat panel, comprising:
at least one processor, and
a memory connected to the at least one processor; wherein the memory stores instructions that can be executed by the at least one processor, and the at least one processor executes the display method of claim 1 by executing the instructions stored in the memory.

16. A non-transitory readable storage medium, comprising a memory, wherein
the memory is used for storing instructions, and when executed by a processor, the instructions cause an apparatus comprising the readable storage medium to complete the display method of claim 1.

* * * * *